E. A. WILSON.
RESILIENT TIRE.
APPLICATION FILED NOV. 2, 1916.
1,245,296.
Patented Nov. 6, 1917.
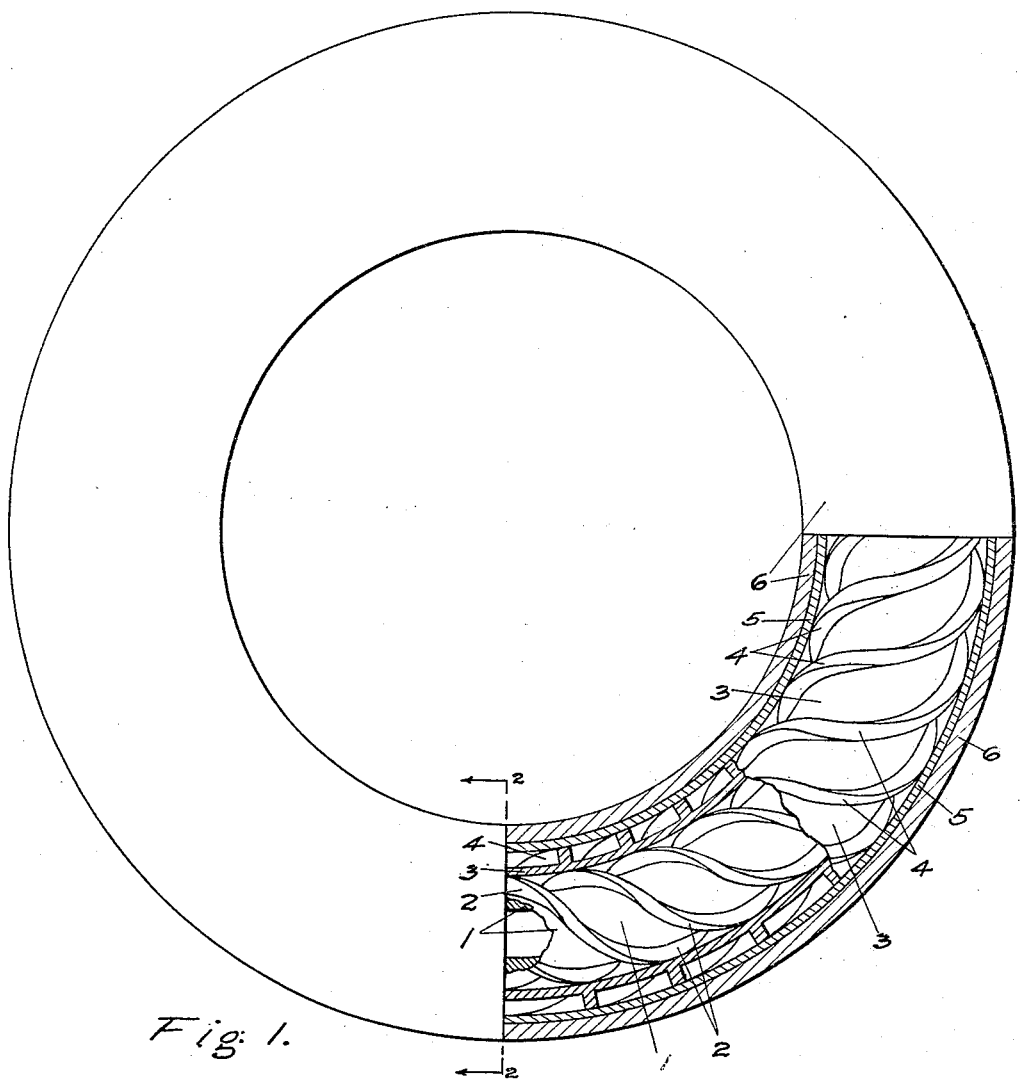
Fig. 1.
Fig. 2.
Witnesses
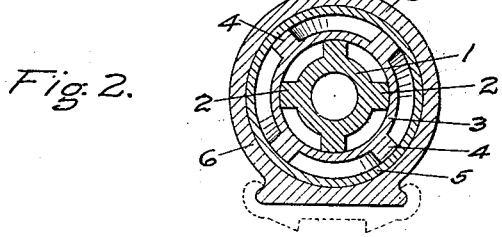
Inventor,
By
Atty.

UNITED STATES PATENT OFFICE.

ELMER A. WILSON, OF PORTLAND, OREGON, ASSIGNOR OF ONE-THIRD TO F. C. BROCKER, OF PORTLAND, OREGON.

RESILIENT TIRE.

1,245,296.     Specification of Letters Patent.     Patented Nov. 6, 1917.

Application filed November 2, 1916. Serial No. 129,143.

*To all whom it may concern:*

Be it known that I, ELMER A. WILSON, a citizen of the United States, residing in the city of Portland, county of Multnomah, and State of Oregon, have invented certain new and useful Improvements in Resilient Tires, of which the following is a specification.

My invention relates to resilient tires, and more particularly to a non-pneumatic, or cushion, tire, as distinguished from a pneumatic tire, and it has for its principal object to provide a cushion tire which will give a maximum amount of resiliency, and yet which shall not be affected by punctures.

In order that others may understand my invention I have illustrated one practical embodiment thereof in the accompanying sheet of drawings.

Figure 1 is a side elevation of a tire embodying my idea, with parts broken out and shown in section to expose the interior construction and arrangement; and Fig. 2 is a cross sectional view on line 2—2 of Fig. 1.

Referring now to the drawings my invention, as here illustrated, comprises an inner tubular member 1, preferably of rubber, provided around its outside with a plurality of spirally disposed ribs 2—2. A second tubular member 3, incloses said first tubular member 1, and its spiral ribs, in the manner indicated, said second tubular member being also provided on its outside with a plurality of spirally disposed ribs, as 4—4. A third tube 5, incloses the tubular members 1 and 3, as shown, and a heavier, or outer casing, 6, incloses all three of the tubular members 1, 3 and 5.

The inner member 1, is relatively heavy and hollow, and the successive outer tubular members, as 3 and 5, are spaced from the inner tubular member 1, and from each other, by the spiral ribs 2—2 and 4—4, in a manner which is very clearly illustrated in the drawings.

Attention is called to the fact, as clearly illustrated in Fig. 2 of the drawings, that the spiral ribs on the different tubular members are in staggered relationship relative to each other, that is, ribs 2—2 of the member 1, for example, engage the tubular member 3, at points between its spiral ribs 4—4, thus giving greater resiliency than if the ribs were in radial alinement with each other.

It will be understood, of course, that any number of tubular members may be mounted one within the other; that any number of ribs may be used, and that any pitch may be given to the spiral disposition of said ribs around the outside of their tube, and also that the outer casing may be adapted in form to be attached to any form of wheel rim.

I do not limit the invention to the exact details as here shown for purposes of illustration, except as I may be limited by the hereto appended claim forming a part hereof.

I claim:

A resilient tire of the character shown and described comprising an inner member provided around its outside with a series of spirally disposed ribs, a tubular member inclosing said inner member and said ribs, said tubular member being provided around its outside with a series of spirally disposed ribs arranged in a staggered position relative to the ribs of said inner member, and an outer tubular member inclosing said tubular member, substantially as shown and described.

Signed at Portland, Multnomah county, Oregon, this 26th day of October, 1916.

ELMER A. WILSON.

In presence of—
J. C. STRENG,
I. M. GRIFFIN.

Copies of this patent may be obtained for five cents each, by addressing the "Commissioner of Patents, Washington, D. C."